United States Patent [19]

Best et al.

[11] Patent Number: 4,995,040
[45] Date of Patent: Feb. 19, 1991

[54] APPARATUS FOR MANAGEMENT, COMPARISON, AND CORRECTION OF REDUNDANT DIGITAL DATA

[75] Inventors: David W. Best, Marion, Iowa; Kevin L. McGahee, Kansas City, Mo.

[73] Assignee: Rockwell International Corporation, El Segundo, Calif.

[21] Appl. No.: 306,611

[22] Filed: Feb. 3, 1989

[51] Int. Cl.$^5$ ............................................. G06F 11/18
[52] U.S. Cl. ..................................... 371/36; 371/68.1
[58] Field of Search ................... 371/36, 68.1, 68.2, 371/68.3

[56] References Cited

U.S. PATENT DOCUMENTS

| | | | |
|---|---|---|---|
| 3,681,578 | 8/1972 | Stevens | 371/36 |
| 3,848,116 | 11/1974 | Moder et al. | 371/36 |
| 4,143,353 | 3/1979 | Schaible | 371/36 |
| 4,225,961 | 9/1980 | Raggenbass et al. | 371/36 |
| 4,665,522 | 5/1987 | Lala et al. | 371/36 |
| 4,771,427 | 9/1988 | Tulpule et al. | 371/8 |
| 4,868,826 | 9/1989 | Smith et al. | 371/9.1 |

Primary Examiner—Charles E. Atkinson
Attorney, Agent, or Firm—M. Lee Murrah; V. Lawrence Sewell; H. Fredrick Hamann

[57] ABSTRACT

A fault tolerant, fail-active computer system comprises a Redundancy Management Unit (RMU) and a plurality of Dual-Port Message Buffers (DPBs) connecting each of a corresponding plurality of communication channels to the RMU. Each DPB includes a message channel interface, a dual-port RAM, a word counter, a page FIFO, a message header FIFO, and a message buffer control circuit. The RMU includes word comparators, 3-state gates, a message comparison control circuit, and a voted message FIFO. Under software control, the RMU and DPBs perform the functions of management of asynchronous redundant digital messages, sorting of redundant messages received in arbitrary order, synchronization of distributed computing elements, comparison of data words of arbitrary bit length, and configuration control of active channels and communication path redundancy.

19 Claims, 3 Drawing Sheets

APPARATUS FOR MANAGEMENT, COMPARISON, AND CORRECTION OF REDUNDANT DIGITAL DATA

TECHNICAL FIELD

The present invention relates to fault tolerant computer networks and, in particular, to apparatus for management of data received on redundant digital communication channels in loosely synchronized distributed computer systems.

BACKGROUND OF THE INVENTION

Redundant communication channels are fundamental to the operation of computer systems where high reliability is essential. For example, digital flight control systems of modern aircraft typically utilize three independent digital computers operating redundantly. Each computer performs a set of calculations and compares its results with those of the other two. Interprocessor communications are conducted over three independent message channels so that no two computers send information on the same channel.

With three independent computational results, each of the redundant computers can perform consistency checks to ensure that the computations are identical. If one of the computers has calculated different results, a hardware or software fault has occurred within some part of the system. In the event of a fault, a two-out-of-three majority "vote" determines which computational results are to be accepted as correct. In addition, discrepancies between the redundant computations can be used to determine within which of the redundant channels the fault has occurred. A faulty channel can then be electronically isolated to prevent further use of its erroneous computations.

If at least two channels of a triple redundant system are operating properly, the overall system will continue to operate without error. At specific time intervals, each computer of the triple redundant system transmits its computational results to and receives data from the other two computers. The computers exchange information in a predetermined time window, during which all copies of the data must be received. Thus, each computer is loosely synchronized with the other computers in the redundant group. Each computer compares its results with the results of the other two by using a software algorithm that identifies and corrects any discrepancies. The results accepted as valid are then used for further system operations.

In addition to triple redundant flight control systems, other examples of prior art redundant computer systems include the Software Implemented Fault Tolerant (SIFT) and the Fault Tolerant Multiprocessor (FTMP) systems.

Like triple redundant systems, the SIFT system also uses direct communication channels between the various computers in the system. However, SIFT is a step beyond basic triple redundancy in that the computers can be dynamically combined into redundant processing groups under software control. This allows graceful degradation because low priority tasks can be terminated to create computational resources to replace failed units. In addition, SIFT can dynamically control the level of redundancy (e.g. dual, triple, quad, etc.) under which each system task is executed.

For a given SIFT configuration, each processor within a redundant group exchanges computational results with the other members of the group. The computers exchange information during a predetermined time window, during which time all copies of the data must be received. Each computer is loosely synchronized with the other members of the redundant group. After data has been exchanged, the results are compared using a software algorithm to identify discrepancies and to designate correct results for further use by the system.

The FTMP system allows computers to be dynamically combined into redundant groups, although the redundancy level is fixed for all system tasks. Computational results are compared during each access to global memory. As a result, the computers within a redundant group are tightly synchronized so that each global memory reference is performed by all participating processors simultaneously.

The FTMP system differs from the foregoing in that the redundant data comparison and correction functions are performed automatically in hardware. This is made possible by the tight synchronization of the message channels. Hardware implementation of these functions results in approximately a 20 to 1 reduction in system overhead for FTMP compared to SIFT systems.

Message comparison in FTMP is performed on a serial bit basis. Error detection and correction is implemented by logic gates. FTMP is also unique in that the data buses forming the inter-processor communication network are multiplexed between the triple redundant clusters, rather than being point-to-point as in SIFT. This results in a significant reduction in hardware, permits a higher degree of fault tolerance, and provides better reliability through incorporation of spare data buses.

In general, inter-processor communication in redundant computer systems requires significant overhead in both system hardware and computing resources. Hardware complexity is increased as the number of unique communication channels is increased. Computational resources are required to manage and control the exchange of redundant data and to perform consistency check and error correction operations. As a result, prior art redundant computer communication systems have the following basic limitations:

1. Point-to-point communication channels require $N(N-1)$ communication channels to accommodate N redundant computers;
2. Redundant communication channels are dedicated to specific computers, so that a fault within a computer causes all of its dedicated channels to be unusable, and
3. A significant percentage of available computer throughput is consumed in managing and controlling the transmission, reception, comparison, and correction of redundant data.

Thus, there is a need for a redundant inter-processor communication system that reduces required communication hardware, provides multiplexed communication channels, and performs data comparison and correction operations in hardware. A major goal is to reduce the system complexity and computational overhead required to manage and control redundant computer elements.

SUMMARY OF THE INVENTION

The present invention is a system for controlling and managing redundant inter-processor communication channels. The system comprises two major components, a Dual-Port Message Buffer and a Redundancy Management Unit. These components provide hardware support for synchronization of redundant, distributed, asynchronous digital computers; comparison of computational results from the redundant computers; and correction of faults detected by means of a majority vote mechanism.

The Dual-Port Message Buffer (DPB) comprises a dual-port random access memory (RAM) which stores a multiplicity of messages that are received asynchronously over a communication channel. Received messages are stored through the first port of the dual-port RAM and removed for processing through the second port. For a given computer, each independent communication channel is serviced by a dedicated DPB.

The Redundancy Management Unit (RMU) comprises control and data path elements that read redundant messages from the DPBs, compare the received data to detect and correct discrepancies, and pass a voted composite result to a host computer.

Thus, the present invention enables a fault tolerant computer system to be constructed by networking groups or clusters of computing elements with multiple communication channels. In operation, the invention allows dissimilar computing elements to be interconnected in a distributed, loosely synchronized manner for performing redundant computations and correcting data errors created by hardware or software faults.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

Figure 1:
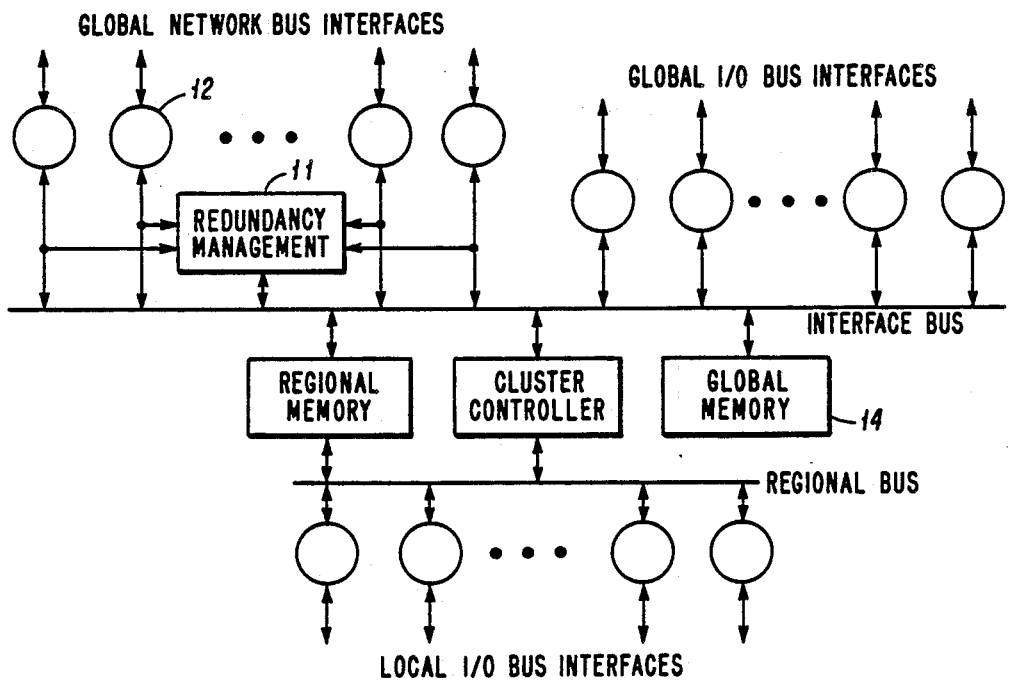
FIG. 1 is a block diagram of a fault tolerant multiprocessing cluster of the present invention.

The present invention comprises a means for controlling and managing redundant inter-processor communication channels. As illustrated in FIG. 1, the present invention allows the construction of a fault tolerant computer system by networking groups or clusters of computing elements with multiple communication channels. The processing cluster shown in FIG. 1 utilizes a Redundancy Management Unit (RMU) 11 in connection with its communication network bus interfaces, each of which contains a Dual-Port Message Buffer (DPB), such as DPB 12.

In the system of FIG. 1, the global buses are dynamically grouped under software control to form redundant communication channels. Messages over these channels represent the computational results of the redundant computers interconnected by the network. Multiplexed digital bus technology can be used so that a given set of communication channels may be shared by multiple redundant processing clusters.

A processing cluster may also contain a data storage area, such as global memory 14, for use by the various computers in the system. As a result, global memory can be distributed throughout the network and may be configured to operate redundantly where global memory elements in two or more clusters store, retrieve, and compare multiple copies of redundant global data. Within cluster groups, identical computations are performed in loose synchronization. Computational results are compared whenever a redundant cluster group accesses the communication network. Network accesses occur during global memory accesses and during inter-processor communication operations.

Figure 2:
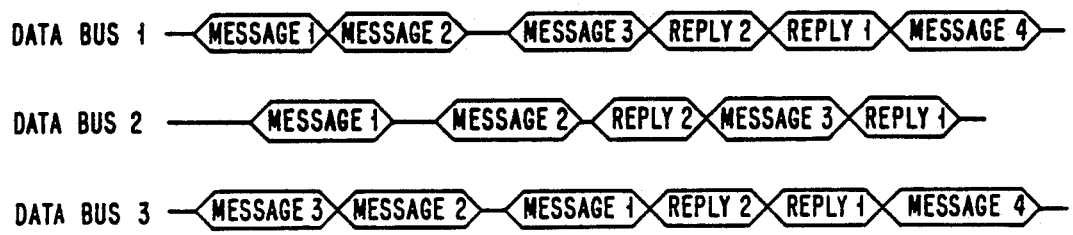
FIG. 2 is a time line illustrating redundant communication channel message transmission.

An example of message flow over a triple redundant communication channel is illustrated in FIG. 2. Because of the loose synchronization of the three processing clusters sending the messages, multiple copies of the redundant messages are not transmitted at the same time (e.g. message 1 on bus 2 lags message 1 on bus 1). In the present invention, messages over each channel do not need to be transmitted in the same order (e.g. message 3 on bus 3 is transmitted before messages 1 and 2 on bus 3). When a cluster has received all copies of a redundant message, a single message reply is issued on each of the participating communication channels.

Figure 3:
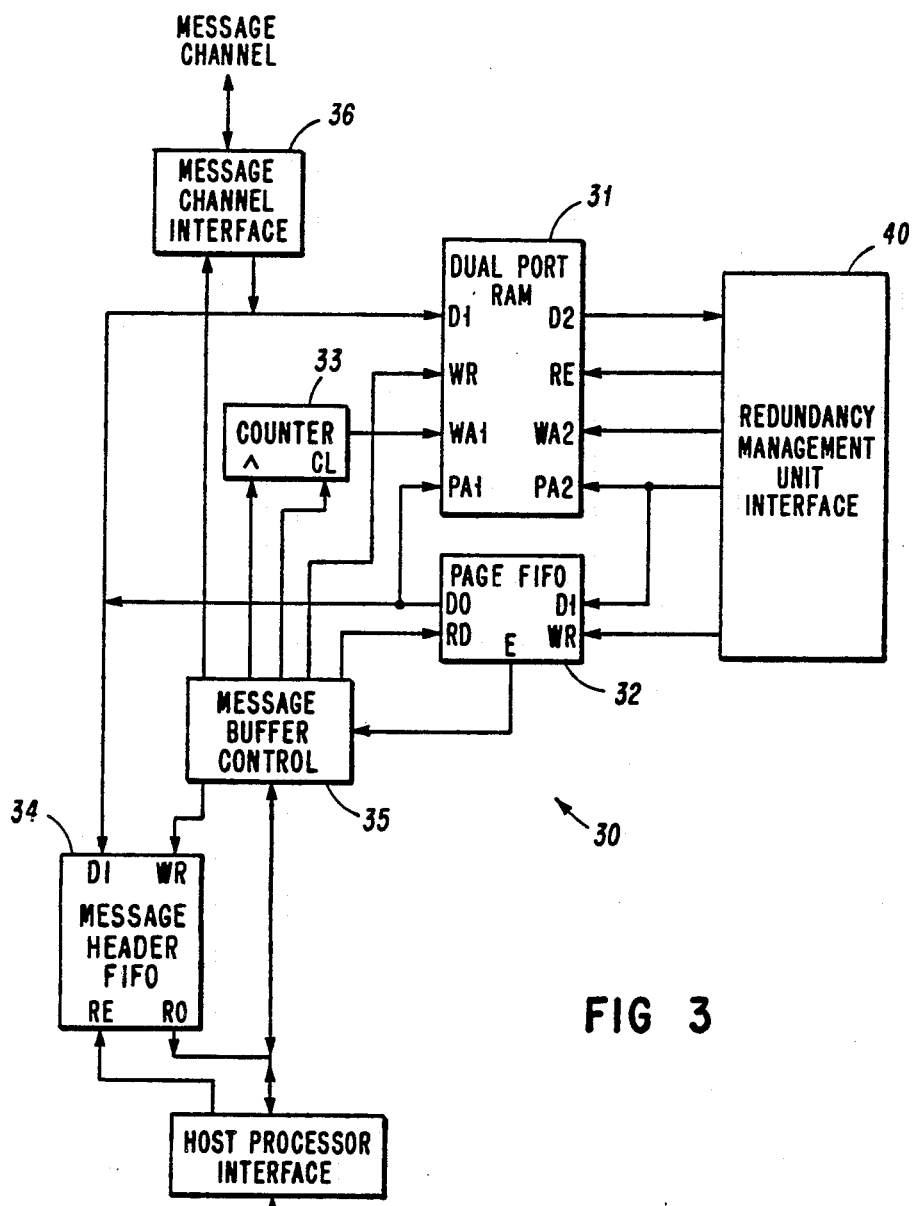
FIG. 3 is a schematic diagram of a Dual-Port Message Buffer (DPB) of the present invention.

Multiple copies of redundant messages are synchronized by DPB 30 illustrated in FIG. 3. For each communication channel, received messages are stored in pages of a Dual-Port RAM 31. Pages within RAM 31 are dynamically allocated by the output of a Page FIFO 32. Page FIFO 32 is loaded with the binary addresses of available (non-allocated) message storage areas within Dual-Port RAM 31. RAM 31 is "paged" by using the page number as the most significant bits of the address to port 1 (PA1 inputs). Data words within each message are stored sequentially at word addresses determined by the output of a Word Counter 33, which inputs the least significant bits of the address to port 1 (WA1 inputs) of RAM 31.

Network messages typically contain control words in a Message Header. This information is used to identify where the message originated, where it is to be sent, and how many data words it contains. Message Header information is not stored in Dual-Port RAM 31 because each copy of a redundant message may have a unique header. Message headers are extracted and stored in a Message Header FIFO 34 prior to reception of the actual message data. A Message Buffer Control 35 provides the required logic and timing signals to a Message Channel Interface 36, the Word Counter 33, the Dual-Port RAM 31, and the Message Header FIFO 34.

As each received message is stored, the corresponding page number is removed from Page FIFO 32 and stored in Message Header FIFO 34, along with the previously extracted Message Header. This information is then accessed by a controlling (or host) computer and used to identify the messages being held within each DPB. Messages accumulate in the DPBs until the controlling processor determines that all copies of a redundant message have been received, or until a timeout occurs indicating that a fault has inhibited one or more messages from arriving. The controlling processor then uses RMU 40 illustrated in FIG. 4 to compare all copies of a redundant message and to identify and correct any discrepancies among the message copies.

Under direction of the host processor, RMU 40 issues a unique page address to the PA2 inputs of each Dual-Port RAM within the active DPBs along with a common word address (WA2 inputs) and appropriate control signals for each redundant data word to be compared. Each word of a given message is compared with a corresponding word in each redundant copy. Discrepancies are detected and corrected and a composite "voted" message is formed. When processing of a message is complete, RMU 40 issues control signals to cause the page address issued to each of the DPBs to be stored in the corresponding Page FIFO. This action results in the page being deallocated, making it available for storage of a new message.

Figure 4:
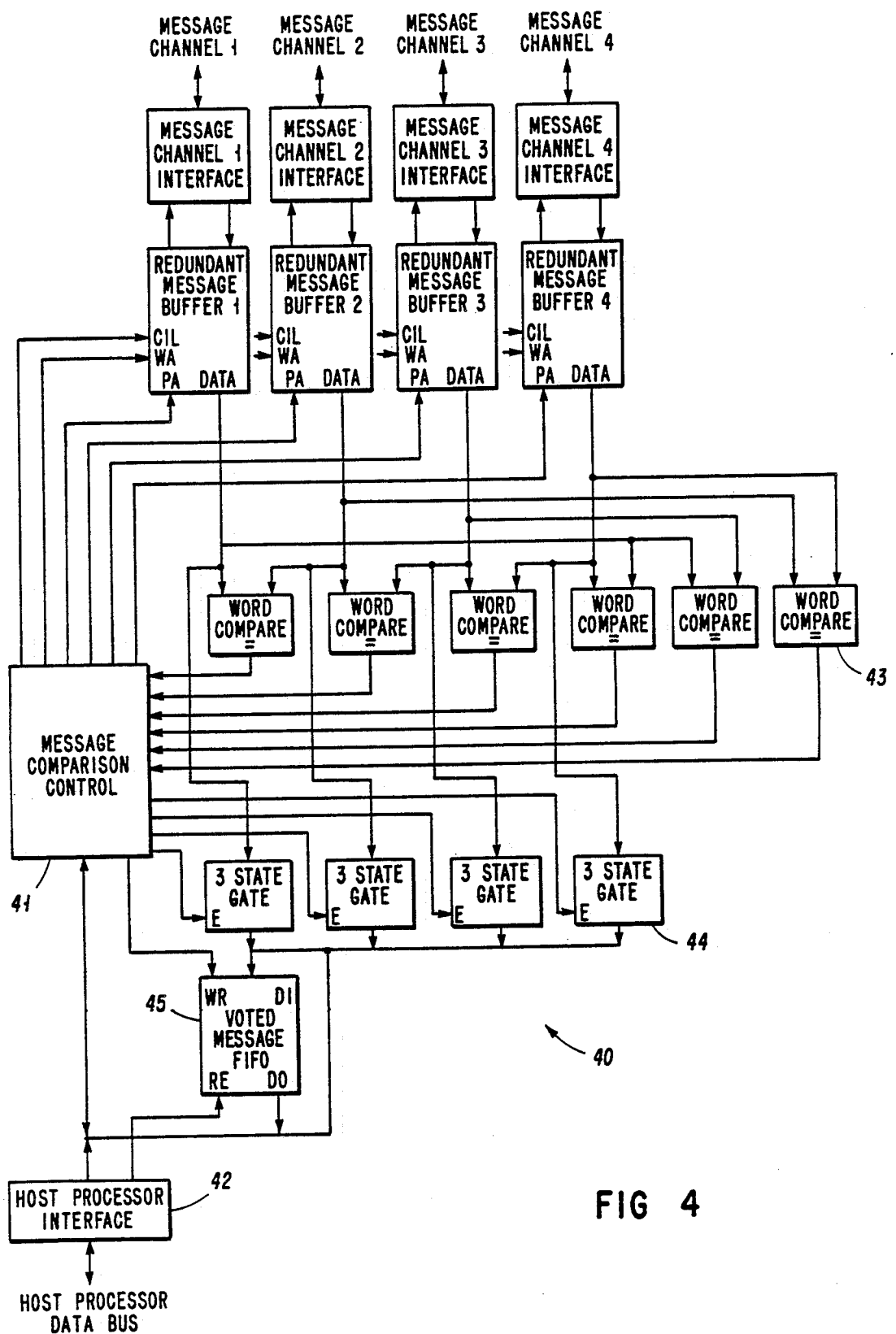
FIG. 4 is a schematic diagram of a Redundancy Management Unit (RMU) of the present invention.

RMU 40 illustrated in FIG. 4 is capable of comparing 2, 3, or 4 copies of a redundant message. In theory, any number of message copies can be accomplished by an appropriate embodiment of the present invention, but the present embodiment is described in terms of quadruple redundancy.

Processing of a redundant message is initiated by the host processor. The message channel and page number corresponding to each message copy to be compared are issued to a Message Comparison Control circuit 41 through a Host Processor Interface 42. The host processor then issues a word count indicating how many data words to compare so that message processing may commence.

Message processing is accomplished by Message Comparison Control 41, which issues the appropriate page numbers, word addresses, and control signals to the DPBs. Each word address causes one data word of each message copy to be read from port 2 of the Dual-Port RAM devices. The data words are then passed to a network of comparator circuits, such as Word Compare 43. Each comparator produces a signal indicating whether or not the two input data words are equal in value. The comparator network of FIG. 4 produces the following equivalence signals:

1. Channel 1 = Channel 2;
2. Channel 1 = Channel 3;
3. Channel 1 = Channel 4;
4. Channel 2 = Channel 3;
5. Channel 2 = Channel 4;
6. Channel 3 = Channel 4.

Based on the foregoing equivalence signals, Message Comparison Control 41 can identify any discrepancies between the messages being compared. A majority vote is performed to determine which channels have correct information. Message Comparison Control 41 then issues signals to the 3-State Gates, such as Gate 44, to pass a data word from one of the correct message channels to a Voted Message FIFO 45. Each word of a redundant message is processed in this manner.

When message processing is complete, Voted Message FIFO 45 contains a single correct copy of the redundant message contents. This data can then be accessed by the controlling computer through Host Processor Interface 42. As an option for self-test, the controlling computer can also address the output of the 3-State Gates directly, thus bypassing Voted Message FIFO 45.

The page number for each message copy read from the DPBs is stored in the corresponding Page FIFO under control of Message Comparison Control 41, effectively deallocating the page of RAM storage and making it available for a newly received message.

RMU 40 is capable of being programmed to compare messages of various redundancy levels. In dual redundant cases, channels 1 and 2, channels 1 and 3, channels 1 and 4, channels 2 and 3, channels 2 and 4, or channels 3 and 4 can be selected for processing. In triple redundant cases, channels 1, 2, and 3; channels 1, 2, and 4; channels 1, 3, and 4; or channels 2, 3, and 4 can be selected for processing. This feature provides the capability of selecting spare communication channels to replace those that have failed, and to gracefully degrade by changing from quadruple to triple to dual redundancy in the event of multiple failures.

Figure 5:
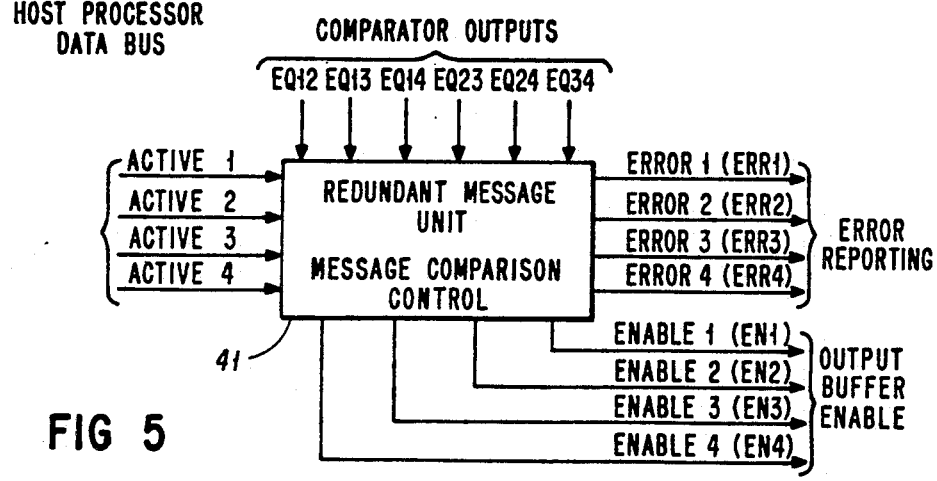
FIG. 5 illustrates the input and output signal relationships of a Message Comparison Control of the RMU of the present invention.

Referring to FIG. 5, Message Comparison Control 41 performs according to a set of logic rules, generating enable signals to the 3-State Gates and error detection signals for use by the host processor, based on the active message channels and the comparator outputs. Message Comparison Control 41 is shown in FIG. 5 with the input and output signal relationships for dual, triple, and quadruple redundancy cases set forth in Tables 1, 2, and 3, respectively, in the Appendix. These operating rules are amenable to simple implementation using a 1,024 word by 8-bit read only memory (ROM) device that provides both high speed and minimal hardware content.

Fault tolerance in highly reliable computer systems for avionics is rapidly becoming a key technology, particularly in flight control systems, as fly-by-wire and nap-of-the-earth guidance systems are becoming more common in new aircraft. Fault tolerant, fail-active computer systems will soon be prominent in both commercial and military aircraft. In providing a fault tolerant system, the present invention includes hardware that performs the following functions: management of asynchronous redundant digital messages; sorting redundant messages that are received in arbitrary order; synchronization of distributed computing elements; comparison of data words of arbitrary bit length; and programmable configuration control of active channels and communication path redundancy. Further, the present invention provides a mechanism for comparing and correcting redundant messages that is independent of the physical data bus transmission rate and protocol. This feature allows operation with virtually any digital network technology.

Although the present invention has been described with respect to a specific embodiment thereof, various changes and modifications may be suggested to one skilled in the art. In particular, the present invention has been described in terms of an embodiment that accommodates quadruple message redundancy, but it is not thus limited. The disclosed techniques for redundant message buffering, comparison, and correction are applicable to redundancy at any level. Likewise, the message length and corresponding word widths are not intended to be limited in any way. It is intended that the present invention encompass those changes and modifications that fall within the scope of the appended claims.

TABLE 1

Message Comparison Control Rules For Dual Redundancy.

Dual Redundancy Conditions

| Active Buffers | Operating Rules |
|---|---|
| 1, 2 | if EQ12=TRUE then EN1=TRUE, ERR1=ERR2=FALSE |

TABLE 1-continued

Message Comparison Control Rules For Dual Redundancy.

Dual Redundancy Conditions

| Active Buffers | Operating Rules |
|---|---|
| 1, 3 | if EQ12=FALSE then ERR1=ERR2=TRUE<br>if EQ13=TRUE then EN1=TRUE, ERR1=ERR3=FALSE<br>if EQ13=FALSE then ERR1=ERR3=TRUE |
| 1, 4 | if EQ14=TRUE then EN1=TRUE, ERR1=ERR4=FALSE<br>if EQ14=FALSE then ERR1=ERR4=TRUE |
| 2, 3 | if EQ23=TRUE then EN2=TRUE, ERR2=ERR3=FALSE<br>if EQ23=FALSE then ERR2=ERR3=TRUE |
| 2, 4 | if EQ24=TRUE then EN2=TRUE, ERR2=ERR4=FALSE<br>if EQ24=FALSE then ERR2=ERR4=TRUE |
| 3, 4 | if EQ34=TRUE then EN3=TRUE, ERR3=ERR4=FALSE<br>if EQ34=FALSE then ERR3=ERR4=TRUE |

TABLE 2

Message Comparison Control Rules For Triple Redundancy.

Triple Redundancy Conditions

| Active Buffers | Operating Rules |
|---|---|
| 1, 2, 3 | if EQ12=EQ13=EQ23=TRUE<br>   then EN1=TRUE, ERR1=ERR2=ERR3=FALSE<br>if EQ12=TRUE & EQ13=EQ23=FALSE<br>   then EN1=TRUE, ERR1=ERR2=FALSE, ERR3=TRUE<br>if EQ13=TRUE & EQ12=EQ23=FALSE<br>   then EN1=TRUE, ERR1=ERR3=FALSE, ERR2=TRUE<br>if EQ23=TRUE & EQ12=EQ13=FALSE<br>   then EN2=TRUE, ERR2=ERR3=FALSE, ERR1=TRUE<br>if EQ12=EQ13=EQ23=FALSE<br>   then ERR1=ERR2=ERR3=TRUE |
| 1, 2, 4 | if EQ12=EQ14=EQ24=TRUE<br>   then EN1=TRUE, ERR1=ERR2=ERR4=FALSE<br>if EQ12=TRUE & EQ14=EQ24=FALSE<br>   then EN1=TRUE, ERR1=ERR2=FALSE, ERR4=TRUE<br>if EQ14=TRUE & EQ12=EQ24=FALSE<br>   then EN1=TRUE, ERR1=ERR4=FALSE, ERR2=TRUE<br>if EQ24=TRUE & EQ12=EQ14=FALSE<br>   then EN2=TRUE, ERR2=ERR4=FALSE, ERR1=TRUE<br>if EQ12=EQ14=EQ24=FALSE<br>   then ERR1=ERR2=ERR4=TRUE |
| 1, 3, 4 | if EQ13=EQ14=EQ34=TRUE<br>   then EN1=TRUE, ERR1=ERR3=ERR4=FALSE<br>if EQ13=TRUE & EQ14=EQ34=FALSE<br>   then EN1=TRUE, ERR1=ERR3=FALSE, ERR4=TRUE<br>if EQ14=TRUE & EQ13=EQ34=FALSE<br>   then EN1=TRUE, ERR1=ERR4=FALSE, ERR3=TRUE<br>if EQ34=TRUE & EQ13=EQ14=FALSE<br>   then EN3=TRUE, ERR3=ERR4=FALSE, ERR1=TRUE<br>if EQ13=EQ14=EQ34=FALSE<br>   then ERR1=ERR3=ERR4=TRUE |
| 2, 3, 4 | if EQ23=EQ24=EQ34=TRUE<br>   then EN2=TRUE, ERR2=ERR3=ERR4=FALSE<br>if EQ23=TRUE & EQ24=EQ34=FALSE<br>   then EN2=TRUE, ERR2=ERR3=FALSE, ERR4=TRUE<br>if EQ24=TRUE & EQ23=EQ34=FALSE<br>   then EN2=TRUE, ERR2=ERR4=FALSE, ERR3=TRUE<br>if EQ34=TRUE & EQ23=EQ24=FALSE<br>   then EN3=TRUE, ERR3=ERR4=FALSE, ERR2=TRUE<br>if EQ23=EQ24=EQ34=FALSE<br>   then ERR2=ERR3=ERR4=TRUE |

TABLE 3

Message Comparison Control Rules For Quadruple Redundancy.

Quadruple Redundancy Conditions

| Active Buffers | Operating Rules |
|---|---|
| 1, 2, 3, 4 | if EQ12=EQ13=EQ14=EQ23=EQ24=EQ34=TRUE<br>   then EN1=TRUE, ERR1=ERR2=ERR3=ERR4=FALSE<br>if EQ12=EQ13=EQ23=TRUE & EQ14=EQ24=EQ34=FALSE<br>   then EN1=TRUE, ERR1=ERR2=ERR3=FALSE, ERR4=TRUE<br>if EQ12=EQ14=EQ24=TRUE & EQ13=EQ23=EQ34=FALSE<br>   then EN1=TRUE, ERR1=ERR2=ERR4=FALSE, ERR3=TRUE<br>if EQ13=EQ14=EQ34=TRUE & EQ12=EQ23=EQ24=FALSE<br>   then EN1=TRUE, ERR1=ERR3=ERR4=FALSE, ERR2=TRUE<br>if EQ23=EQ24=EQ34=TRUE & EQ12=EQ13=EQ14=FALSE<br>   then EN2=TRUE, ERR2=ERR3=ERR4=FALSE, ERR1=TRUE<br>if EQ12=EQ13=EQ14=EQ23=EQ24=EQ34=FALSE |

TABLE 3-continued
Message Comparison Control Rules For Quadruple Redundancy.
Quadruple Redundancy Conditions

| Active Buffers | Operating Rules |
|---|---|
| | then ERR1=ERR2=ERR3=ERR4=TRUE |
| if | EQ12=EQ34=TRUE & EQ13=EQ14=EQ23=EQ24=FALSE |
| | then ERR1=ERR2=ERR3=ERR4=TRUE |
| if | EQ23=EQ14=TRUE & EQ12=EQ13=EQ14=EQ24=FALSE |
| | then ERR1=ERR2=ERR3=ERR4=TRUE |
| if | EQ24=EQ13=TRUE & EQ12=EQ14=EQ23=EQ34=FALSE |
| | then ERR1=ERR2=ERR3=ERR4=TRUE |
| if | EQ12=TRUE & EQ13=EQ14=EQ23=EQ24=EQ34=FALSE |
| | then EN1=TRUE, ERR3=ERR4=TRUE |
| if | EQ13=TRUE & EQ12=EQ14=EQ23=EQ24=EQ34=FALSE |
| | then EN1=TRUE, ERR2=ERR4=TRUE |
| if | EQ14=TRUE & EQ12=EQ13=EQ23=EQ24=EQ34=FALSE |
| | then EN1=TRUE, ERR2=ERR3=TRUE |
| if | EQ23=TRUE & EQ12=EQ13=EQ14=EQ24=EQ34=FALSE |
| | then EN2=TRUE, ERR1=ERR4=TRUE |
| if | EQ24=TRUE & EQ12=EQ13=EQ14=EQ23=EQ34=FALSE |
| | then EN2=TRUE, ERR1=ERR3=TRUE |
| if | EQ34=TRUE & EQ12=EQ13=EQ14=EQ23=EQ24=FALSE |
| | then EN3=TRUE, ERR1=ERR2=TRUE |

We claim:

1. A redundancy management unit, comprising:
    means for receiving asynchronous redundant digital messages;
    means for storing the asynchronous digital messages as they are received;
    means for determining when a predetermined number of said asynchronous digital messages has been received;
    means connected to said receiving means for comparing said redundant digital messages;
    means connected to said comparing means for voting to select a correct message from said redundant messages; and
    means connected to said voting means for storing said correct message.

2. The redundancy management unit of claim 1, wherein said receiving means comprises a plurality of dual-port message buffers connected to receive said redundant messages on a corresponding plurality of independent communication channels.

3. The redundancy management unit of claim 2, wherein each of said dual-port buffers comprises a dual-port random access memory (RAM) for storing data words of said message.

4. The redundancy management unit of claim 3, wherein each of said dual-port buffers further comprises a page FIFO connected to said RAM for storing addresses of message storage areas within said RAM.

5. The redundancy management unit of claim 4, wherein each of said dual-port buffers further comprises a message header FIFO connected to said RAM for storing message header information associated with the data words stored in said RAM.

6. The redundancy management unit of claim 5, wherein each of said dual-port buffers further comprises a message buffer control connected to said RAM, said page FIFO, and said message header FIFO for providing control and timing signals thereto.

7. The redundancy management unit of claim 2, wherein said comparing means comprises a plurality of word comparator circuits.

8. The redundancy management unit of claim 7, wherein each of said word comparators receives data words from two of said communication channels and produces an equivalence signal indicating whether or not the two data words are equal.

9. The redundancy management unit of claim 8, wherein said voting means comprises a message comparison control connected to said word comparators.

10. The redundancy management unit of claim 9, wherein said storing means comprises a voted message FIFO connected to said message comparison control for storing a single correct copy of said redundant message.

11. A redundancy management unit for managing asynchronous redundant digital messages, comprising:
    a plurality of dual-port message buffers connected to receive the asynchronous redundant messages on a corresponding plurality of independent communication channels;
    means for determining when a predetermined number of said asynchronous redundant messages has been received; and
    means connected to said dual-port buffers for comparing the redundant messages and voting to select a correct message from the redundant messages.

12. The redundancy management unit of claim 11, wherein said comparing means comprises a plurality of word comparators, each of said word comparators receiving data words from two of said communication channels and producing an equivalence signal indicating whether or not the two data words are equal.

13. The redundancy management unit of claim 12, wherein said voting means comprises a message comparison control connected to said word comparators and a voted message FIFO connected to said message comparison control for storing a single correct copy of the redundant message.

14. The redundancy management unit of claim 13, wherein each of said dual-port message buffers comprises a dual-port random access memory (RAM) for storing data words of the message and a page FIFO connected to said RAM for storing addresses of message storage areas within said RAM.

15. The redundancy management unit of claim 14, wherein each of said dual-port buffers further comprises a message buffer control connected to said RAM, said page FIFO, and said message header FIFO for providing control and timing signals thereto.

16. Apparatus for managing redundant digital data, comprising:

a plurality of dual-port message buffers connected to receive asynchronous redundant digital messages on a corresponding plurality of independent communication channels; and means for determining when a predetermined number of the asynchronous redundant messages has been received;

a redundancy management unit connected to said dual-port buffers for comparing said redundant digital messages and for voting to select a correct message from said redundant messages.

17. The apparatus of claim 16, wherein each of said dual-port message buffers comprises:

a dual-port random access memory (RAM) for storing data words of the message;

a page FIFO connected to said RAM for storing addresses of message storage areas within said RAM;

a message header FIFO connected to said RAM for storing message header information associated with the data words stored in said RAM; and a message buffer control connected to said RAM, said page FIFO, and said message header FIFO for providing control and timing signals thereto.

18. The apparatus of claim 17, wherein said redundancy management unit comprises a plurality of word comparators, each of said word comparators receiving data words from two of said communication channels and producing an equivalence signal indicating whether or not the two data words are equal.

19. The apparatus of claim 18, wherein said redundancy management unit further comprises a message comparison control connected to said word comparators and a voted message FIFO connected to said message comparison control for storing a single correct copy of the redundant message.

* * * * *